US010786899B2

(12) United States Patent
Kimoto

(10) Patent No.: US 10,786,899 B2
(45) Date of Patent: Sep. 29, 2020

(54) DEVICE FOR CALCULATING STOWAGE PATTERN AND ROBOT CONTROLLER

(71) Applicant: FANUC CORPORATION, Yamanashi (JP)

(72) Inventor: Yuuki Kimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 83 days.

(21) Appl. No.: 16/143,469

(22) Filed: Sep. 27, 2018

(65) Prior Publication Data
US 2019/0143504 A1 May 16, 2019

(30) Foreign Application Priority Data
Nov. 14, 2017 (JP) .................. 2017-219161

(51) Int. Cl.
*G06F 7/00* (2006.01)
*B25J 9/16* (2006.01)

(52) U.S. Cl.
CPC ............ *B25J 9/163* (2013.01); *B25J 9/1607* (2013.01); *B25J 9/1669* (2013.01); *B25J 9/1679* (2013.01); *B25J 9/1687* (2013.01); *G05B 2219/40006* (2013.01); *G05B 2219/40067* (2013.01); *G05B 2219/40324* (2013.01)

(58) Field of Classification Search
None
See application file for complete search history.

(56) References Cited

U.S. PATENT DOCUMENTS

| 4,356,208 A * | 10/1982 | Williams ............... C12G 1/062 209/325 |
| 2004/0146390 A1* | 7/2004 | Lancaster, III ........ B65G 57/03 414/797.4 |
| 2017/0267467 A1 | 9/2017 | Kimoto et al. |

FOREIGN PATENT DOCUMENTS

| CN | 107200228 A | 9/2017 |
| JP | H1-92127 A | 4/1989 |
| JP | H6-22209 U | 3/1994 |
| JP | H6-64751 A | 3/1994 |
| JP | 2005-89067 A | 4/2005 |
| JP | 2011-128897 A | 6/2011 |
| JP | 2017-94428 A | 6/2017 |

* cited by examiner

*Primary Examiner* — Yolanda R Cumbess
(74) *Attorney, Agent, or Firm* — Hauptman, Ham LLP

(57) ABSTRACT

A calculation device for calculating an appropriate stowage pattern of articles, and a robot controller including the calculation device. The calculation device has: a model generating section configured to generate first physical models of the articles based on dimensions of respective types of the articles, and generate a second physical model of a containing region in which the articles are stacked, based on a dimension of the containing region; a locating section configured to locate the first models in the second model, in descending order of priority predetermined with respect to the types of the articles; and a physical calculating section configured to add vibration or a shock to the second model each time when the first models is located in the second model, and calculate a change in a position and/or orientation of the first model in the second model due to the vibration or the shock.

7 Claims, 6 Drawing Sheets

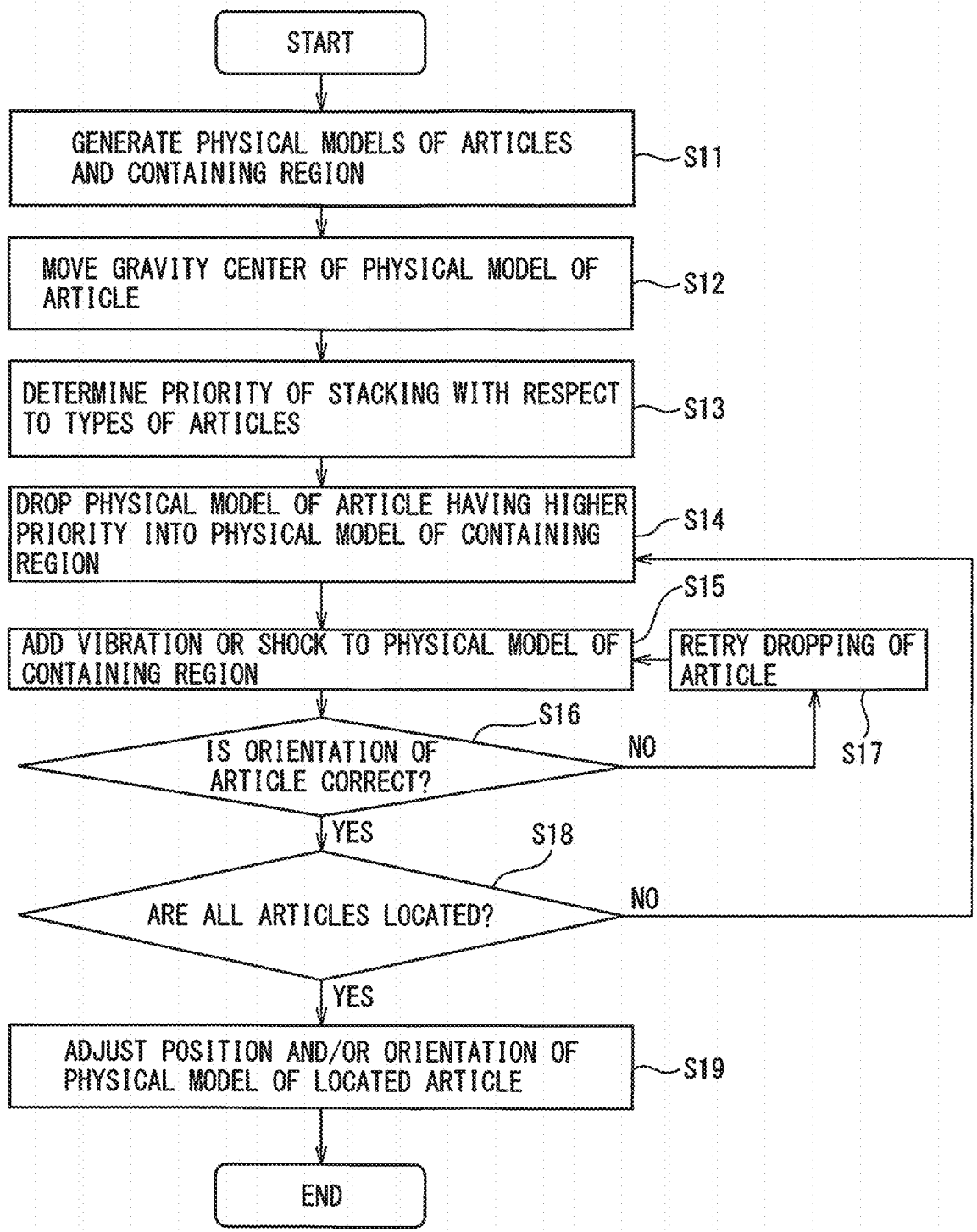

DEVICE FOR CALCULATING STOWAGE PATTERN AND ROBOT CONTROLLER

RELATED APPLICATIONS

The present application claims priority of Japanese Patent Application No. 2017-219161, filed on Nov. 14, 2017, the disclosure of which is hereby incorporated by reference herein in its entirety.

BACKGROUND OF THE INVENTION

1. Field of the Invention

The preset invention relates to a calculation device for calculating a stowage pattern of articles, and a robot controller including the calculation device.

2. Description of the Related Art

In a system such as a palletizing system, in which a plurality of articles are stacked on an accumulation means or containing means such as a pallet, simulating or calculating an order and/or pattern for stacking the articles is well known (e.g., see JP H01-092127 A and JP 2005-089067 A). On the other hand, in a simulation for locating a plurality of members in a container, calculating a change in the position and/or orientation of the member by generating vibration or a shock, and a gravity force is well known (e.g., see JP 2011-128897 A).

In the conventional palletizing system, an algorithm for calculating a stowage (stacking) pattern of a plurality of article may be used, whereas such an algorithm does not calculate the stowage pattern by using physical calculation. Therefore, in the prior art, it is difficult to stack randomly conveyed articles in an appropriate pattern.

SUMMARY OF THE INVENTION

One aspect of the present disclosure provides a calculation device for calculating a stowage pattern of a plurality of articles, the calculation device comprising: a model generating section configured to generate first physical models of the articles based on dimensions of respective types of the articles, and generate a second physical model of a containing region in which the articles are stacked, based on a dimension of the containing region; a locating section configured to locate the first physical models in the second physical model, in descending order of priority, the priority being previously determined with respect to the types of the articles; and a physical calculating section configured to add vibration or a shock to the second physical model each time when at least one of the first physical models is located in the second physical model, and calculate a change in a position and/or orientation of the first physical model in the second model due to the vibration or a shock.

Another aspect of the present disclosure provides a robot controller, comprising: a plurality of the calculation devices as described above; a pattern selecting section configured to select a stable stowage pattern, from among a plurality of stowage patterns calculated by the plurality of calculation devices; and a program generating section configured to automatically generate a motion program based on the positions and orientations of the first physical models of the articles included in the stowage pattern selected by the pattern selecting section, by which a robot stacks the articles.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 6 is a flowchart exemplifying a modification of the procedure in the embodiment;

DETAILED DESCRIPTIONS

Figure 1:
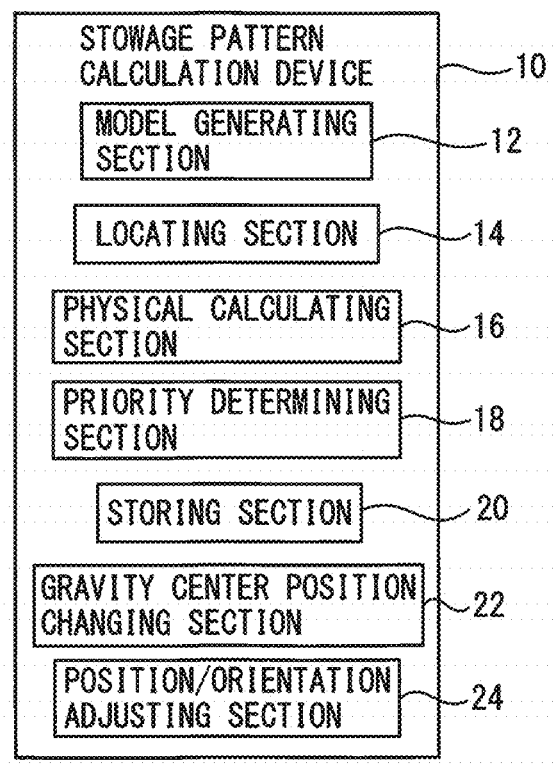
FIG. 1 shows an example of a configuration of a stowage pattern calculation device according to a preferred embodiment of the present disclosure.

FIG. 1 is a functional block diagram showing an example of a configuration of a stowage pattern calculation device (hereinafter, also referred to as a calculation device) 10 according to a present disclosure. Calculation device 10 is a device for calculating a stowage (stacking) pattern of a plurality of articles (workpieces), and includes: a model generating section 12 configured to generate first physical models of the articles based on dimensions of respective types of the articles, and generate a second physical model of a containing region in which the articles are stacked, based on a dimension of the containing region; a locating section 14 configured to locate the first physical models in the second physical model, in descending order of priority, the priority being previously determined with respect to the types of the articles; and a physical calculating section 16 configured to add vibration or a shock to the second physical model each time when at least one of the first physical models is located in the second physical model, and calculate a change in a position and/or orientation of the first model in the second model due to the vibration or the shock. Further, calculation device 10 is configured to, after the first physical models of all of the articles are located within the second physical model, determine and store the stowage pattern of the first physical models within the second physical model, as a stowage pattern of the articles stacked within the containing region.

Calculation device 10 may have a priority determining section 18 configured to automatically determine the priority of stacking of the articles based on at least one of weights, dimensions and withstand loads of the respective types of the articles. Alternatively, the priority may be input to calculation device 10 by an operator through a suitable input device, etc., and input data of the priority may be stored in a storing section 20, such as a memory of a personal computer. In such a case, locating section 14 may read out the data relating to the priority from storing section 20. In addition, storing section 20 may be used to store the stowage pattern which is conclusively determined.

Calculation device 10 may have a gravity center position changing section 22 configured to change a position of the center of gravity of the first physical model (e.g., to a predetermined bottom surface of the first physical model), in order to prevent the orientation of the first physical model from not being adapted to be stacked. Further, when the orientation of the first physical model is not adapted to be stacked, locating section 14 may relocate this first physical model.

Further, calculation device 10 may have a position/orientation adjusting section 24 configured to adjust at least one of the position and orientation of at least one of the first physical models, after all of the first physical models are located in the second physical model.

For example, calculation device 10 may be a personal computer, and model generating section 12, locating section 14, physical calculating section 16, priority determining section 18, storing section 20, gravity center position changing section 22 and position/orientation adjusting section 24 may be realized by a CPU, a GPU and a memory, etc., provided to the personal computer. Further, the personal computer may have a function or a device to automatically generate a motion program of a robot based on the stowage pattern calculated by calculation device 10, and transmit the motion program to a robot controller as explained below.

Figure 2:
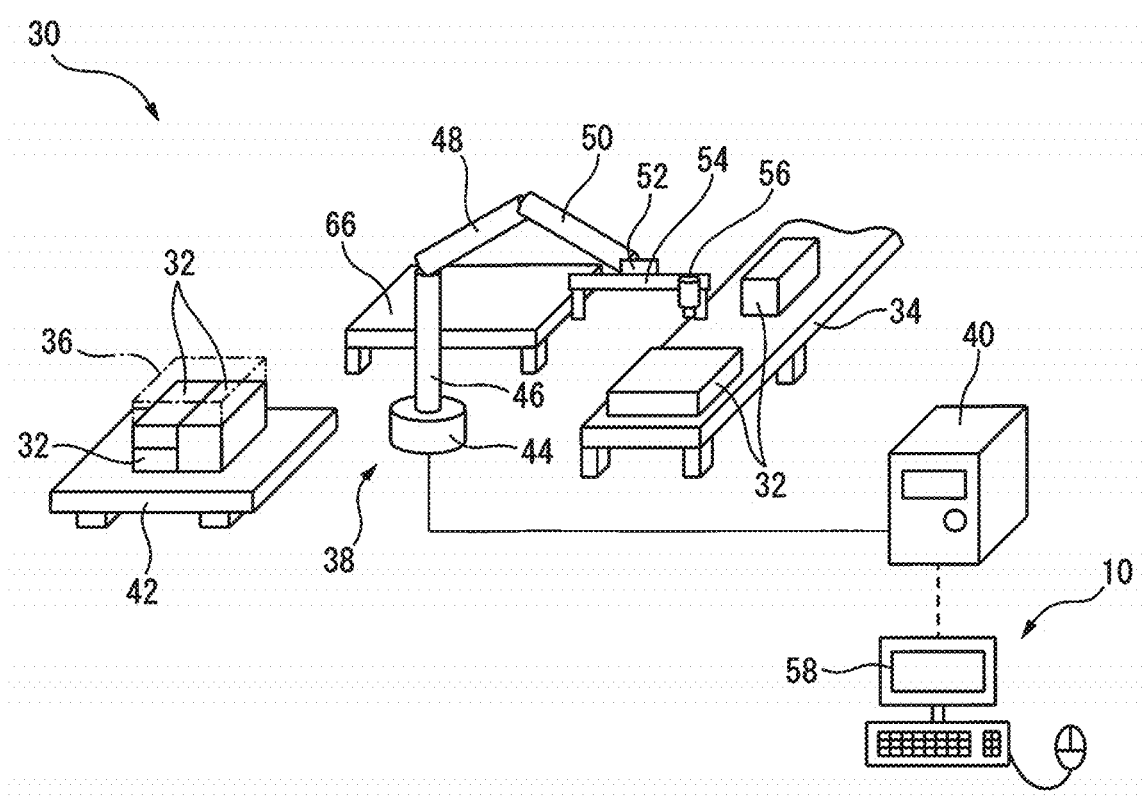
FIG. 2 shows an example of a configuration of a palletizing system for stacking articles based on a stowage pattern calculated by the calculation device of FIG. 1.

FIG. 2 shows an example of a schematic configuration of a palletizing system 30, as an example a system for actually stacking the articles based on the stowage pattern calculated by calculation device 10. Palletizing system 30 has: a conveyor 34 configured to sequentially convey a plurality of articles (workpieces) 32; a robot 38 configured to hold workpiece 32 on conveyor 34 and move the held workpiece into a predetermined containing region 36; and a robot controller 40 connected to robot 38 and configured to control the motion of robot 38. Calculation device 10 and robot controller 40 are communicably connected to each other, and thus robot controller 40 can control robot 38 so as to perform stacking motion of the workpieces, based on the stowage pattern received from calculation device 10. Alternatively, (the function of) calculation device 10 may be incorporated in robot controller 40, i.e., the function of each section of calculation device 10 may be realized by a CPU, a GPU and a memory, etc., provided to robot controller 40.

Containing region 36 is previously determined as a region which can contain all of workpieces 32 to be stacked. For example, as shown in FIG. 2, containing region 36 may be a space defined on a pallet 42, in which stacked workpieces 32 can exist, or, an inner space defined by a container (not shown) such as a box or cage.

In the illustrated example, robot 38 is a multi-joint robot having a movable part, and has: a base part 44; a rotating body 46 attached to base part 44 and rotatable about a generally vertical axis; an upper arm 48 rotatably attached to rotating body 46; a forearm 50 rotatably attached to upper arm 48; a wrist axis 52 rotatably attached to forearm 50; a robot hand 54 attached to wrist axis 52; and a camera 56 attached to the movable part (e.g., hand 54) of robot 38. Robot hand 54 may be various types of hands capable of holding workpiece 32, e.g., a gripping hand having claws, or an adsorption hand having an electromagnet or a sucking nozzle.

Robot controller 40 is configured to control camera 56 so as to capture an image of workpiece 32 on conveyor 34, execute image processing of the captured image, and then detect the position and orientation of workpiece 32 relative to robot 38. Further, robot controller 40 is configured to transmit a command to robot 38, by which robot 38 holds workpiece 32 based on the detected position and orientation of the workpiece, and locates the held workpiece into containing region 36 based on the stowage pattern as explained below.

Next, an example of a procedure by using calculation device 10 will be explained, with reference to FIGS. 3 to 5c. In the following embodiment, three types of workpieces having different dimensions are stacked (in other words, mixed loading is carried out), whereas the present invention is not limited as such. Further, workpieces having the same dimension and different specific gravities (densities) may be defined or treated as "plural types of workpieces." Note that the following procedure is an offline process (or a simulation) which may be virtually executed in calculation device 10 or robot controller 40, and a result of at least a part of the offline process may be displayed on a suitable screen, such as a display 58 of the personal computer, as shown in FIG. 2.

Figure 4A:
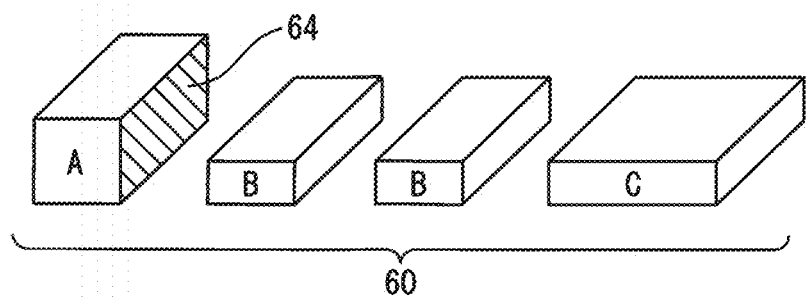
FIG. 4a exemplifies a physical model of the article.

First, in step S1, virtual physical models are generated for calculating the stowage pattern of the mixed loading. Concretely, as shown in FIG. 4a, first physical models 60 are generated based on the weights, the dimensions and the number of respective types of the workpieces. Further, a second physical model 62 is generated based on the dimension of the containing region in which the workpieces are located or stacked. In this example, there are three types of workpieces A, B and C having the dimensions different from each other, and first physical models 60 include one workpiece A, one workpiece C, and two workpieces B. On the other hand, second physical model 62 is a virtual space which is the same as or slightly larger than containing region 36 defined on pallet 42, and has a size so that second physical model 62 can contain all of the first physical models.

In the next step S2, a (degree of) priority of stacking is determined with respect to the types of the workpieces. The priority is used to determine an order of stacking of the workpieces (or the first physical models) in the containing region (or the second physical model). For example, by using the memory and the CPU (or priority determining section 18) of calculation device 10, the priority may be calculated based on factors such as the weight per unit area, the dimension and/or the withstand load of each workpiece. In particular, a relatively high priority may be set to the workpiece having relatively high weight per ground contact area, relatively high dimension or relatively high withstand load. As another example, an integrated priority may be calculated for each workpiece, by using the above factors after being weighted. As still another example, the priority of each workpiece may be input or designated to the calculation device by the operator through a suitable input device such as a keyboard or a touch panel, etc. In the embodiment, the priority of workpiece C is the highest, and the priority of workpiece B is the lowest (C>A>B).

In the next step S3, the first physical model of the workpiece having the higher (highest) priority determined in step S2 is located in the second physical model. In this regard, it is not necessary to precisely adjust the position the first physical model, in other words, the first physical model can be roughly positioned in the second physical model. In this example, workpiece C is firstly located in second physical model 62.

In the next step S4, to second physical model 62 representing the containing region, vibration or a shock is added. After that, among remaining workpieces A and B, workpiece A having the higher priority is located in second physical model 62 (step S5→S3), and then, vibration or a shock is added to second physical model 62, and a change in the positional relationship between the workpieces in the second physical model is calculated (step S4). Finally, workpiece B having the lowest priority is located in second physical model 62 (step S5→S3), and then, vibration or a shock is added to second physical model 62, and a change in the positional relationship between the workpieces in the second physical model is calculated (step S4).

The vibration or the shock added to the second physical model means a physical force sufficient to change the position and/or orientation of at least one first physical model within the second physical model. Preferably, the vibration or the shock acts in the generally horizontal (front-back or left-right) direction. Although the vibration or the shock may have a vertical component (in the up-and-down direction), in such a case, it is preferable that the positional relationship between the workpieces in the containing region in the vertical direction be not changed by the vibration or the shock (e.g., the vertical component of the vibration or the shock be limited to a certain degree). In the embodiment, the vibration may widely swing the second physical model with a relatively low frequency, and the shock may incline the second physical model.

Figure 4B:
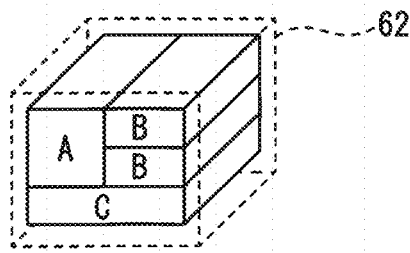
FIG. 4b exemplifies a physical model of a containing region.
Figure 5A:
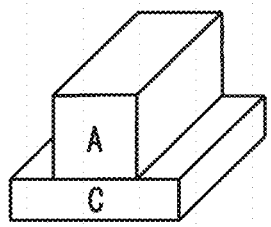
FIGS. 5a to 5c exemplify a change in position of the physical model of the article.
Figure 5B:
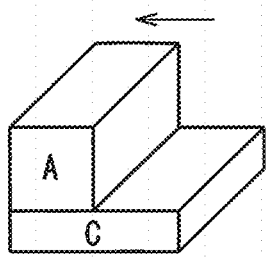
Figure 5C:
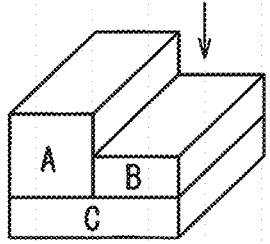

FIGS. 5*a* to 5*c* shows an example of the change in the position of the workpiece within second physical model 62 generated by repeating steps S3 to S5. For example, even when workpiece A is positioned at the generally center of workpiece C in step S3 (FIG. 5*a*), workpiece A is moved on workpiece C by adding the vibration or the shock to second physical model 62, whereby a vacant space for subsequently locating workpiece B can be automatically generated (FIG. 5*b*), and workpiece B can be appropriately located (FIG. 5*c*). By virtue of such a simulation in which the vibration or the shock and the gravity force are considered, a stowage (stacking) pattern as shown in FIG. 4*b*, in which a clearance between the neighboring workpieces does not exist or is significantly small, can be automatically calculated and determined, without taking an algorithm, etc., into consideration. The calculated stowage pattern may be transmitted from calculation device 10 to robot controller 40, and then, robot controller 40 may control robot 38 so as to stack workpieces 32 onto pallet 40, based on the received stowage pattern.

As explained above, in the embodiment, the physical models of the articles (workpieces) are located in the physical model of the containing region, and then the positional relationship between the workpieces is changed by adding the vibration or the shock to (the physical model of) the containing region, whereby the vacant space where the subsequent workpiece should be located can be automatically generated. Therefore, the stowage pattern suitable for the actual stacking of the workpieces can be automatically calculated. Further, since the physical calculation is used in the embodiment, even when the article or the containing region does not have a simple box shape, an appropriate stowage pattern can be calculated without taking a calculation algorithm into consideration.

FIG. 6 is a flowchart exemplifying a modification of the procedure in the embodiment. First, in step S11, similarly to step S1 of FIG. 3, the virtual physical models for calculating the stowage pattern of the mixed loading, i.e., first physical models 60 of the workpieces and second physical model 62 of the containing region are generated.

In the next step S12, in each first physical model, the position of the gravity center thereof is moved. Concretely, a correct orientation of each workpiece when the workpiece is appropriately stacked and a bottom surface of the workpiece at the correct orientation are previously determined. Then, the center of gravity of the workpiece is set or changed on or near the bottom surface (or the ground contact surface). For example, with respect to workpiece A as shown in FIG. 4*a*, in case that one surface 64 of workpiece A should be set as the bottom surface, by moving the gravity center of workpiece A on surface 64 and then executing location (dropping) calculation of the workpiece as explained below, the probability, that workpiece A is located while surface 64 (or the bottom surface) contacts workpiece C, can be significantly increased.

Figure 3:
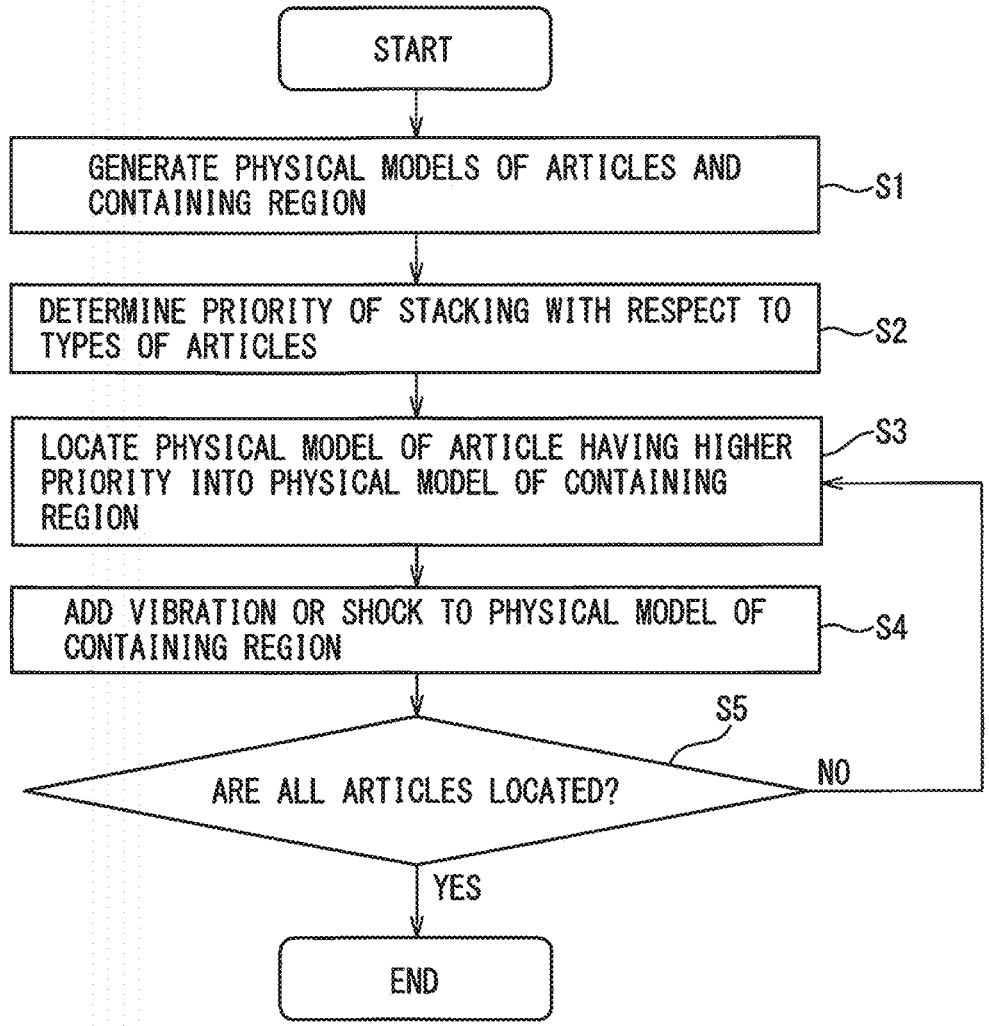
FIG. 3 is a flowchart exemplifying a procedure in the embodiment.

In the next step S13, similarly to step S2 of FIG. 3, the (degree of) priority of stacking is determined with respect to the types of the workpieces.

In the next step S14, the first physical model of the workpiece having the higher (highest) priority determined in step S13 is located in the second physical model. In this regard, as one aspect of the location, the first physical model may be dropped from above into the second physical model. Due to the collision between the dropped first physical model of the workpiece and the other first physical model and/or the second physical model, the position and/or orientation of the dropped first physical model and/or the other first physical model may be changed, whereby the dropped first physical model can be automatically located into the vacant space in the second physical model.

In the next step S15, similarly to step S4 of FIG. 3, to second physical model 62 representing the containing region, vibration or a shock is added. In the next step S6, it is judged as to whether or not the orientation of the located (dropped) first physical model of the workpiece corresponds to the correct orientation for the stacking as described in step S12. Concretely, when the surface of the model of the workpiece previously determined as the bottom surface is not downwardly directed after the model is dropped and remained still, it can be judged that the orientation of the first physical model is incorrect.

When the orientation of the first physical model of the workpiece is not correct, the procedure progresses to step S17, in which the dropping motion (or the calculation of the dropping) of the same workpiece is repeated. Step S17 is repeated until the orientation of the first physical model becomes correct. In the embodiment, since the position of the gravity center of the first physical model has been changed in step S12, it is unlikely that the orientation of the first physical model becomes incorrect (concretely, the surface predetermined as the bottom surface does not become the lowermost surface). However, depending on the position and/or orientation of the dropped workpiece, and the position and/or orientation of the workpiece previously located in the second physical model, the first physical model of the dropped workpiece may not represent the correct orientation adapted for the stacking. In the embodiment, even in such a case, by retrying the dropping motion (or relocating motion) of the workpiece and adding the vibration or the shock to the second physical model, the first physical model of the dropped workpiece may represent the correct orientation adapted for the stacking. In this regard, in case that the dropping motion should be repeated, a different result can be obtained when the model of the workpiece is dropped from the same position with the same orientation, since the position and orientation of the model of the other workpiece are changed from the last dropping. However, it is preferable that the model of the workpiece be dropped from the different position, and/or be dropped with the different orientation.

When the orientation of the dropped model of the workpiece is correct, among the remaining workpieces, the first physical model of a workpiece having the higher priority is dropped into the second physical model, and checking and correcting of the orientation of the newly dropped workpiece is repeated (steps S14 to S18).

Figure 7:
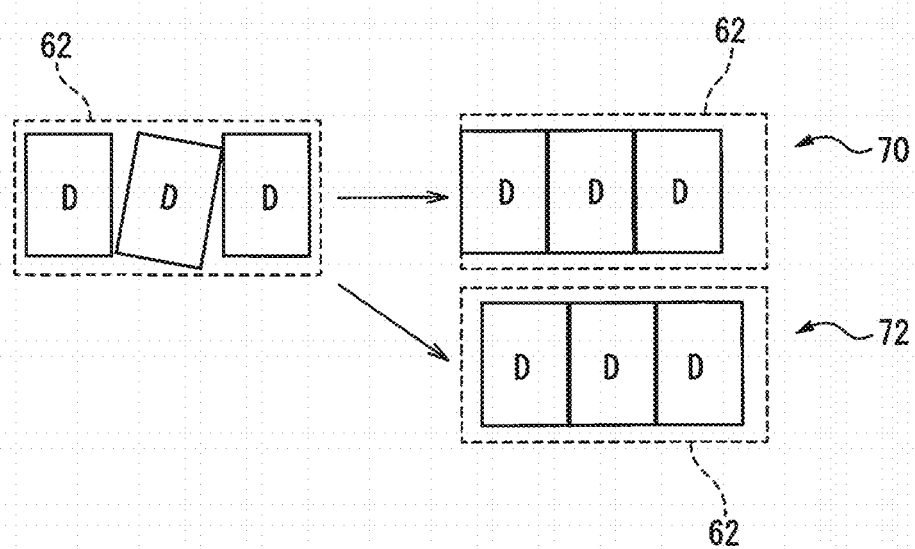
FIG. 7 shows the physical models of the article and the containing region viewed from the above.

Although the procedure may be terminated at this stage, the procedure may further progresses to step S19, in which at least one of the position and orientation of at least one of the first physical models located in the second physical model is adjusted. For example, as shown in a left part of FIG. 7 indicating second physical model 62 viewed from the above, first physical models representing three workpieces D are not aligned at the beginning. In this case, as indicated by a reference numeral 70, by inclining second physical model 62 towards the left side, three (models of) workpieces D are displaced towards the left side, and then the three workpieces are aligned. Alternatively, as indicated by a reference numeral 72, by applying equal force to the models of the three workpieces in the front-back and left-right directions, the models of the three workpieces can be aligned and positioned at the generally center of second physical model 62. As explained above, by adjusting the positions and/or orientations of all of the models of the workpieces which have been roughly located in the second model by the physical calculation, the stowage pattern in which the models of the workpieces are aligned can be calculated.

Optionally, the adjusted position and orientation (X, Y, Z, W, R, P) in the virtual three-dimensional space of each of the workpieces may be obtained as numeric values, the numeric values may be compared to the dimension of the workpiece, and then the numeric values may be modified. For example, when the workpiece having the width of 600 mm is positioned at a point having an X-coordinate of 901.893 mm, the X-coordinate may be modified to 900 mm by being rounded down to the nearest ten. By virtue of this, an editorial operation, etc., of the calculated stowage pattern can be easily carried out.

As in the above embodiment, when the plurality of workpieces (in the embodiment, workpieces B) have the same priority (or the same type), the first physical models of these workpieces may be simultaneously or sequentially located (or dropped) in the second physical model. When the first physical models are sequentially located, it is preferable that the vibration or the shock be added to the second physical model each time when the first physical model of one workpiece is located in the second physical model.

Among the explained processes (steps) with reference to FIGS. 3 and 6, all of the processes, other than the process in which the operator designates (or inputs) the priority, can be automatically executed. Therefore, the operator can determine an optimum stowage pattern without using an advanced knowledge or algorithm.

As in the embodiment explained above, the stowage pattern is calculated by using the degree of priority, in which the workpieces are arranged in the order of (C→A→B). However, in fact, the workpieces may be conveyed by the conveyor in the order of (B→A→C). In such a case, as shown in FIG. 2, a temporary placing table 66 for workpiece 32 may be arranged in a region to which the movable part of robot 38 in system 30 can be moved, whereby workpiece A or B, which has been conveyed before workpiece C is conveyed, may be located on temporary placing table 66 until workpiece C is held and located in containing region 36 by robot 38. By virtue of such a configuration, the workpiece (in this case, workpiece A or B) having the low priority (i.e., having the low stacking order) may be located into containing region 36 by robot 38 at an appropriate timing, after the workpiece (in this case, workpiece C) having the high priority (i.e., having the high stacking order) is located.

Figure 8:
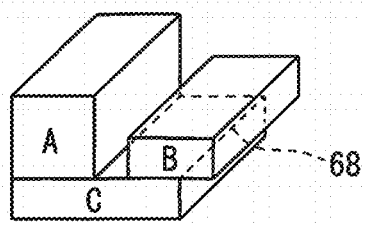
FIG. 8 shows an example in which a degree of stability of the stacked article is relatively low.

As another preferable embodiment, a plurality of calculation devices 10 may be prepared, by which a plurality of stowage patterns can be simultaneously calculated. Then, among the calculated stowage patterns, the (most) stable stowage pattern can be automatically selected (or adopted). For example, as shown in FIG. 8, when a part of a bottom surface of one workpiece (in the drawing, workpiece B) contacts an article (in the drawing, workpiece C) under workpiece B, and an area ratio of the part of the bottom surface to the entire bottom surface is relatively low, it can be considered that the position of the gravity center of workpiece B is close to a peripheral edge 68 of workpiece C. In fact, it is likely that workpiece B stacked as shown in FIG. 8 falls or unpiles. Therefore, it can be judged that the case as shown in FIG. 8 is unstable.

Concretely, based on the representative dimension of each workpiece, a margin (e.g., 1/10 of the representative dimension) may be predetermined. When a distance, from the position of the gravity center of a first workpiece to a peripheral edge of a second workpiece under the first workpiece, is larger than the margin, it can be judged that the first workpiece is stably stacked. In addition, when all of the workpieces are considered to be stably stacked by the above judgment, the degree of stability of the workpieces can be quantitatively calculated, by calculating an area ratio of a part of a bottom surface to the entire bottom surface of each workpiece, the part of the bottom surface contacting the other article under each workpiece.

When the plurality of calculation devices are used, preconditions (the shape and the number of the workpiece(s), and the dimension of the containing region, etc.) may be common to each calculation device, whereas calculation conditions (the magnitude and the direction of the vibration or the shock, and the drop position of the first physical model to the second physical model, etc.) may be different between the calculation devices.

As explained above, by simultaneously calculating the stowage patterns by using the plurality of calculation devices, the stowage patterns can be calculated in a short time, and the optimum stowage pattern (having the highest degree of stability) can be selected among the calculated stowage patterns. Further, based on the positions and orientations of the first physical models of the workpieces included in the calculated stowage pattern, a motion program of the robot can be automatically generated, by which the robot stacks the articles. The plurality of calculation devices, the pattern selecting function (or a pattern selecting section) and the program generating function (or a program generating section) may be prepared as a programming device such as a personal computer, or may be incorporated in the robot controller as a processor, etc.

According to the present disclosure, by locating the first physical models of the articles in the second physical model of the containing region in descending order of the priority, and by adding the vibration or the shock to the second physical model of the containing region, the vacant space for locating the article can be automatically generated. Therefore, the appropriate stowage pattern can be calculated or determined, without taking a calculation algorithm into consideration.

While the invention has been described with reference to specific embodiments, it will be understood, by those skilled in the art, that various changes or modifications may be made thereto without departing from the scope of the following claims.

The invention claimed is:

1. A calculation device configured to calculate a stowage pattern of a plurality of articles, the calculation device comprising:
  a model generating section configured to generate first physical models of the articles of the stowage pattern based on dimensions of respective types of the articles, and generate a second physical model of a containing region in which the articles are stacked, based on a dimension of the containing region;
  a locating section configured to locate the first physical models of the stowage pattern in the second physical model, in descending order of priority, the priority being previously determined with respect to the types of the articles; and
  a physical calculating section configured to add vibration or a shock to an entirety of the second physical model so that a position and/or orientation of the first physical model in the second physical model is changed, each time when at least one of the first physical models is located in the second physical model, and calculate a change in the position and/or orientation of the first physical model in the second physical model due to the vibration or the shock, wherein
  the calculation device is configured to automatically output the calculated stowage pattern to a robot controller to cause a robot to stack the plurality of articles in the containing region using the calculated stowage pattern.

2. The calculation device as set forth in claim 1, further comprising a priority determining section configured to automatically determine the priority based on at least one of weights, dimensions and withstand loads of the respective types of the articles.

3. The calculation device as set forth in claim 1, wherein the locating section locates the first physical model in the second physical model, by dropping the first physical model into the second physical model.

4. The calculation device as set forth in claim 1, further comprising a gravity center position changing section configured to set a position of the center of gravity of the first physical model on a predetermined bottom surface of the first physical model.

5. A calculation device as set forth in claim 1, wherein, when the orientation of the first physical model is not adapted to be stacked after the vibration or a shock is added to the second physical model by the physical calculating section, the locating section relocates the first physical model, the orientation of which is not adapted to be stacked.

6. The calculation device as set forth in claim 1, further comprising a position/orientation adjusting section configured to adjust at least one of the position and orientation of at least one of the first physical models, after all of the first physical models are located in the second physical model.

7. A robot controller, comprising:
  a plurality of calculation devices, each calculation device comprising:
  a model generating section configured to generate first physical models, of a stowage pattern of a plurality of articles, based on dimensions of respective types of the articles, and generate a second physical model of a containing region in which the articles are stacked, based on a dimension of the containing region;
  a locating section configured to locate the first physical models of the stowage pattern in the second physical model, in descending order of priority, the priority being previously determined with respect to the types of the articles; and
  a physical calculating section configured to add vibration or a shock to an entirety of the second physical model so that a position and/or orientation of the first physical model in the second physical model is changed, each time when at least one of the first physical models is located in the second physical model, and calculate a change in the position and/or orientation of the first physical model in the second physical model due to the vibration or the shock,
  the robot controller further comprising:
  a pattern selecting section configured to select a stable stowage pattern, from among a plurality of stowage patterns calculated by the plurality of calculation devices; and
  a program generating section configured to automatically generate a motion program based on the positions and orientations of the first physical models of the articles included in the stowage pattern selected by the pattern selecting section, to cause a robot to stack the plurality of articles in the containing region using the selected stowage pattern.

* * * * *